(12) United States Patent
Kwatra et al.

(10) Patent No.: US 11,327,747 B2
(45) Date of Patent: May 10, 2022

(54) SENTIMENT BASED OFFLINE VERSION MODIFICATION

(71) Applicant: INTERNATIONAL BUSINESS MACHINES CORPORATION, Armonk, NY (US)

(72) Inventors: Shikhar Kwatra, San Jose, CA (US); Zachary A. Silverstein, Jacksonville, FL (US); Jeremy R. Fox, Georgetown, TX (US); Gregory J. Boss, Saginaw, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/014,047

(22) Filed: Sep. 8, 2020

(65) Prior Publication Data

US 2022/0075616 A1    Mar. 10, 2022

(51) Int. Cl.
*G06F 9/44* (2018.01)
*G06F 8/71* (2018.01)
*H04L 67/306* (2022.01)
*G06F 8/65* (2018.01)
*H04W 84/18* (2009.01)

(52) U.S. Cl.
CPC ............. *G06F 8/71* (2013.01); *G06F 8/65* (2013.01); *H04L 67/306* (2013.01); *H04W 84/18* (2013.01)

(58) Field of Classification Search
CPC .......... G06F 8/71; G06F 8/65; H04L 67/306; H04W 84/18
USPC ................... 717/168–178, 100–120
See application file for complete search history.

(56) References Cited

U.S. PATENT DOCUMENTS

| | | | |
|---|---|---|---|
| 9,063,818 B1 | 6/2015 | Risbood | |
| 9,947,037 B2 | 4/2018 | Bastide | |
| 10,798,547 B2 * | 10/2020 | Gold | G06Q 30/02 |
| 10,922,483 B1 * | 2/2021 | Shevchenko | G06F 40/20 |
| 2006/0206587 A1 | 9/2006 | Fabbrocino | |
| 2009/0017812 A1 | 1/2009 | Chan | |

(Continued)

OTHER PUBLICATIONS

Disclosed Anonymously, "System and Method to Recommend Software Update," IP.Com Prior Art Database Technical Disclosure, IP.Com No. IPCOM000228806D, https://ip.com/IPCOM/000228806, Jul. 8, 2013, pp. 1-3.

(Continued)

*Primary Examiner* — Chuck O Kendall
(74) *Attorney, Agent, or Firm* — John Noh

(57) ABSTRACT

A method, a computer program product, and a computer system modify a version of an application. The method includes determining a sentiment being experienced by a second user while using a second version of the application installed on a second device associated with the second user based on sensory information indicative of the sentiment. The method includes generating sentiment associated information associating the sentiment of the second user with the second version of the application, the sentiment associated information configured to be exchanged with the first device over an offline, ad hoc connection. The method includes transmitting the sentiment associated information to the second device. The sentiment associated information is indicative of whether the first version of the application is to be modified on the first device to the second version of the application.

25 Claims, 6 Drawing Sheets

(56) References Cited

U.S. PATENT DOCUMENTS

2009/0265699 A1 10/2009 Toeroe
2010/0257185 A1 10/2010 Dvir
2019/0250898 A1 8/2019 Yang

OTHER PUBLICATIONS

Mell et al., "The NIST Definition of Cloud Computing", National Institute of Standards and Technology, Special Publication 800-145, Sep. 2011, pp. 1-7.

* cited by examiner

SENTIMENT BASED OFFLINE VERSION MODIFICATION

BACKGROUND

The exemplary embodiments relate generally to application versions, and more particularly to modifying a version of an application in an offline capacity based on a crowd sourced sentiment of the version.

A personal computing device may have a plurality of applications that are installed. In one particular application, the personal computing device may include an operating system on which further applications may be configured to operate. Developers of applications may provide updates for the applications for a variety of reasons. For example, the developers may include new features or security measures. To incorporate these features, the application that is installed on a device must be updated accordingly. Conventional approaches to updating applications may include automated settings that update the applications whenever an update is available (e.g., immediately, at a predefined time during the day or week, etc.), manual settings that require the user to perform certain operations for the updates to be applied, and/or a combination thereof.

Updating applications on a device may be a laborious task to manage. With regard to notification of updates, conventional approaches often push the updates at users regardless of time or convenience. For example, an update for a first application may be pushed to the user (e.g., a popup window requesting the update be downloaded and installed) while the user is utilizing a second application on the device. This process may therefore occur at inopportune times that may lead to a poor user experience as there is no mechanism to gauge the type of response or experience the user may have pertaining to the targeted update. Furthermore, an update for an application may include changes to the application that negatively affect the experience of the user (e.g., increased processing requirements that result in decreased overall performance of the device). Thus, despite the user having installed the update, the user may ultimately choose to revert to a previous version of the application prior to the update. However, such a process may not be familiar to the user and may be stuck with the update and the poor user experience.

SUMMARY

The exemplary embodiments disclose a method, a computer program product, and a computer system for modifying a version of an application. The method comprises determining a sentiment being experienced by a second user while using a second version of the application installed on a second device associated with the second user based on sensory information indicative of the sentiment. The method comprises generating sentiment associated information associating the sentiment of the second user with the second version of the application, the sentiment associated information configured to be exchanged with the first device over an offline, ad hoc connection. The method comprises transmitting the sentiment associated information to the second device. The sentiment associated information is indicative of whether the first version of the application is to be modified on the first device to the second version of the application.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
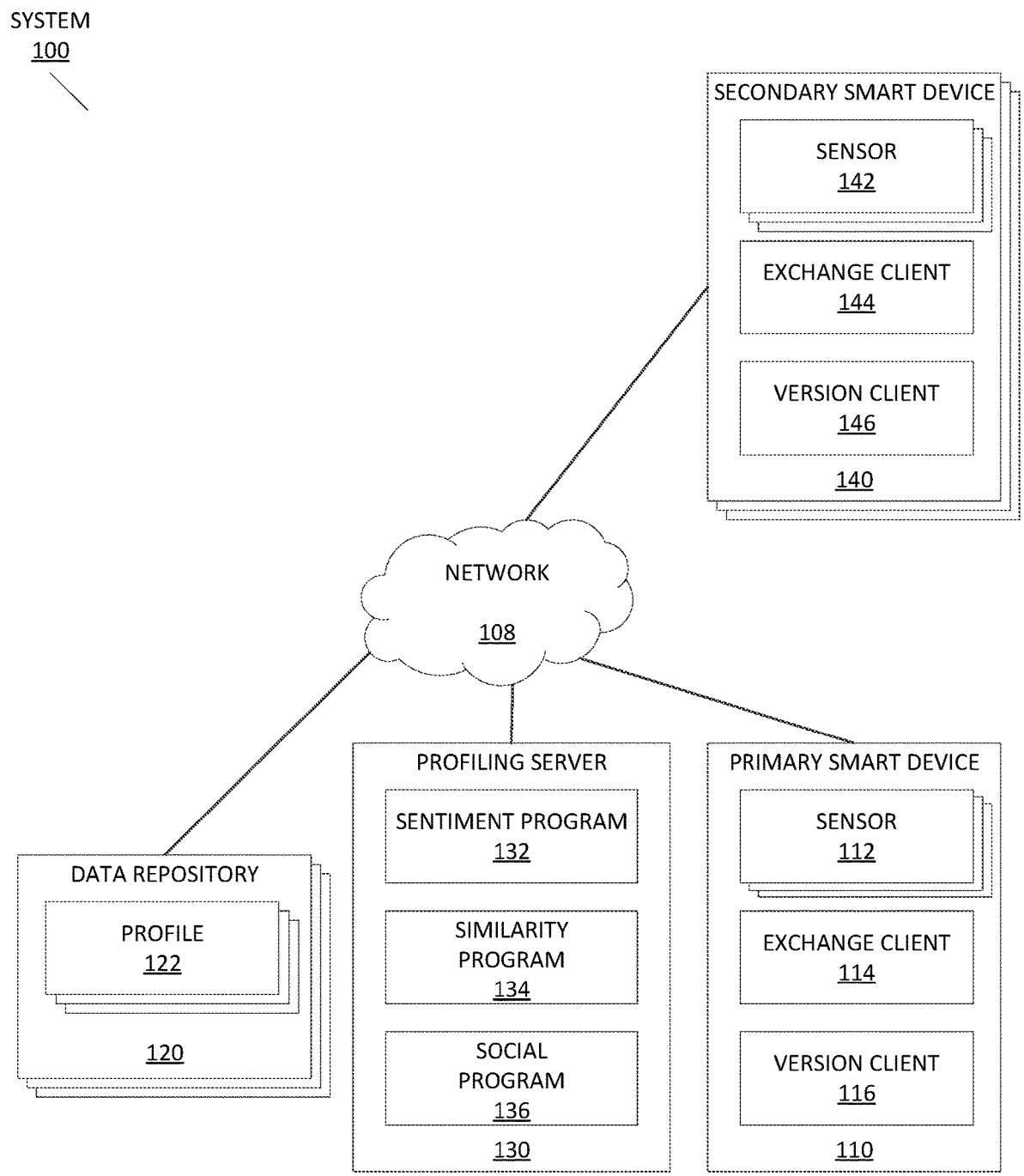
FIG. 1 depicts an exemplary schematic diagram of a version modification system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for modifying a version of an application in an offline capacity based on a crowd-sourced sentiment of the version. A primary user may be using a primary device on which a first version of an application is installed. By tracking sentiments of a plurality of secondary users who use a second version of the application, the primary device may determine whether to modify the version from the first version to the second version either through an upgrade (e.g., the second version is a more current version) or a downgrade (e.g., the first version is a more current version). The exemplary embodiments may further utilize an offline approach to modifying the version of the application in which the primary device and the secondary device with the different version of the application establish a connection when in a predefined range. Based on the sentiment of the secondary user of the secondary device, appropriate data may be exchanged over the connection for the primary device to modify the version of the application. Key benefits of the exemplary embodiments may include a social interaction based approach to modifying an application so that a user may use a version of the application that generally provides a better user experience when multiple versions are available. Detailed implementation of the exemplary embodiments follows.

Conventional approaches have provided a variety of mechanisms in which to modify versions of applications, usually through an upgrade to a most current version of the application. When social interaction is involved, a conventional approach may monitor vendor interactions and device vulnerabilities due to associated operations as well as recommendation analyses of software updates to overcome vulnerabilities from other vendor/system interactions. Another conventional approach may entail recommending and applying new software updates at different time periods based on user interaction and behavioral patterns associated with previous updates that essentially relies on a raw mathematical and statistical mechanism to predict upgrade probability. A further conventional approach may recommend software updates based on user interactions over social networks by analyzing behavioral patterns related to a frequency of interaction between users related to software updates. However, these conventional approaches often are limited to software upgrades (e.g., replacing an older version to a newer version), a general monitoring of user sentiments without qualifying the user sentiments, and utilization of a network and network components.

The exemplary embodiments are configured to provide an improved manner for a user to know when to engage device updates based on the projected success rate of other users in a social network comprising other users who may be predetermined to be qualified in providing the success information. The exemplary embodiments may utilize the collective experience of the crowd (e.g., like-minded users within a social network and/or other users with similar application configurations including similar applications, drivers, configurations, etc.) and use this collective experience for expected results and experiences for software updates. Through the crowd sourced success information, the exemplary embodiments may provide an automated approach to application modification for a positive user experience in a predicted manner.

As will be described in further detail below, the exemplary embodiments may utilize offline updates for an application installed on a primary smart device associated with a primary user using communications with at least one secondary smart device for respective secondary users based on sentiment including feedback and frustration levels faced by the secondary users in using a version of the application that is different from a version of the application on the primary smart device. Through various sentiment analysis (e.g., through a deep learning neural network), the exemplary embodiments may be configured to understand user experiences by the secondary users with a version of an application and share the version of the application with the primary user in an offline form. The exemplary embodiments may automatically perform the application modification or provide a modification recommendation for the application to the primary user based on a success rate and/or satisfaction level of the secondary users who are within the social circle of the primary user (e.g., the primary user's trusted friends).

The exemplary embodiments are described with particular reference to the application to be modified being an operating system installed on the smart devices of the primary and secondary users. However, the exemplary embodiments may be utilized and/or modified for use with any aspect that is installed on the smart devices. Accordingly, the mechanisms provided by the exemplary embodiments may be utilized and/or modified for use in modification of applications, features, software, firmware, etc.

FIG. 1 depicts a version modification system 100, in accordance with the exemplary embodiments. According to the exemplary embodiments, the version modification system 100 may include a primary smart device 110, one or more data repositories 120, a profiling server 130, and one or more secondary smart devices 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

The exemplary embodiments are described with regard to a primary user, a primary smart device 110 associated with the primary user, a secondary user, and a secondary smart device 140 associated with the secondary user. The primary and secondary designation is representative of a perspective for which the exemplary embodiments may be implemented and does not define a priority. For example, a primary user may indicate a perspective for which an application may be modified based on the mechanism of the exemplary embodiments. A secondary user may indicate a perspective of providing sentiment information associated with a version of an application that provides a basis on which to modify the application being used by the primary user. Thus, the "primary" designation may refer to an entity for which an application is to be modified based on the crowd sourced sentiment analysis and the "secondary" designation may refer to one or more entities from which the crowd sourced sentiment information derives.

In the exemplary embodiments, the network 108 may be a communication channel capable of transferring data between connected devices. Accordingly, the components of the version modification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the version modification system 100 that do not utilize the network 108. As will be described in detail below, a connection may be established between the primary smart device 110 and one of the secondary smart devices 140 that may or may not utilize the network 108. The connection that is established in this manner may be ad hoc, near field communications based (e.g., Bluetooth), mobile to mobile (M2M) based, etc. (collectively referred to herein as "ad hoc").

In the exemplary embodiments, the primary smart device 110 may include one or more sensors 112, an exchange client 114, and a version client 116, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the primary smart device 110 is shown as a single device, in other embodiments, the primary smart device 110 may be comprised of a cluster or plurality of computing devices, in a modular manner, etc., working together or working independently. The primary smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the one or more sensors 112 may generate various types of information associated with the primary user and/or the primary smart device 110. The sensors 112 may generate sensory information that may be packaged in a raw form and/or in a processed form with associated indications of the type of sensory information. The sensory information may be visual, auditory, haptic, etc.

For example, the sensors 112 may include an imager such as a camera. The imager may generate image data of the primary user. For example, the imager may capture features of a user's face, the user's head, the user's shoulders, the user's limbs, etc. In capturing these features, the sensors 112 may indicate or decipher a probable expression that the user may have at a given moment (e.g., while using a version of an application). In this manner, the imager may gather facial micro expressions for a temporal mood analysis.

In another example, the sensors 112 may include eye trackers configured to determine a location on which the user's eyes are focusing. For example, the eye trackers may determine durations of focus of the user's eyes while using a version of an application. In capturing the focus point of the eyes and durations of that focus, the sensors 112 may indicate or decipher a probable sentiment that the user may have at a given moment (e.g., while using a version of an application).

In a further example, the sensors 112 may include biometric sensors configured to detect biometric readings of the primary user. For example, the sensors 112 may include respective biometric sensors such as a heart rate monitor configured to determine a heart rate, a thermometer configured to determine a temperature, a blood pressure monitor configured to determine a blood pressure, etc. In capturing these features, the sensors 112 may indicate or decipher a probable sentiment that the user may have at a given moment (e.g., while using a version of an application). In this manner, the biometric sensors may monitor expressions for a temporal mood analysis.

In an additional example, the sensors 112 may include a microphone configured to determine any auditory output from the user. For example, the microphone may capture verbal or non-verbal expressions, breathing patterns, etc. In capturing auditory information, the sensors 112 may indicate or decipher a probable sentiment that the user may have at a given moment (e.g., while using a version of an application).

In yet another example, the sensors 112 may include trackers related to events occurring on the primary smart device 110. The sensors 112 may include a mobile tracker engine that monitors or records the activity of the primary user. For example, the mobile tracker engine may utilize a keylogger and application monitoring tools to compute a variety of events such as a speed and correlate the same to a cognitive state of the primary user during a predefined temporal period.

In the exemplary embodiments, the exchange client 114 may act as a client in a client-server relationship and may be a software, hardware, and/or firmware based application capable of transmitting sensory information of the primary user and receiving sentiment associated information for versions of applications via the network 108 as well as receiving sentiment associated information for versions of applications via an ad hoc connection. In embodiments, the exchange client 114 may perform operations in an automated manner without user intervention although some implementations may incorporate manual operations as well as interact with one or more components of the version modification system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

In addition to the data exchange operations noted above, the exchange client 114 may further be configured to receive the sensory information from the sensors 112 and perform processing thereon. As noted above, the sensory information from the sensors 112 may be transmitted in a raw format in which the sensory information from the sensors 112 are merely packaged and transmitted or a processed format in which the sensory information from the sensors 112 are at least partially processed and then packaged and transmitted. According to an exemplary implementation, the exchange client 114 of the primary smart device 110 may perform processing operations on the sensory information from the sensors 112. In another exemplary implementation, the profiling server 130 may perform processing operations on the sensory information from the sensors 112 (e.g., for sensory information that is raw and/or pre-processed). In a further exemplary implementation, the sensors 112 may perform processing operations on the sensory information from the sensors 112. In yet another exemplary implementation, at least two of the exchange client 114, the profiling server 130, and the sensors 112 may perform processing operations on the sensory information.

The processing operations on the sensory information from the sensors 112 may generate a plurality of different indications related to the sentiment of the primary user. That is, the processing operations may generate or prepare the sensory information to be the sentiment associated information related to the primary user. For example, with the imager, the processing operations may analyze the micro expressions on the face of the user to determine a sentiment such as happiness, sadness, contentedness, frustration, etc. The processing operations may utilize any mechanism in which to determine the sentiment of the primary user based on the micro expressions on the face of the primary user. In another example, with the eye tracker, the processing operations may analyze focus areas or deviations from a display device of the primary smart device 110. The processing operations may analyze the viewing pattern to determine whether the primary user remains focused or deviates the focus intermittently, continuously, randomly, etc. The viewing pattern may be used to determine a sentiment of the primary user such as continued focus indicative of contentedness while frequent deviations in focus indicative of frustration. In a further example, with the biometric sensor, the processing operations may analyze the biometric readings of the primary user where select biometric readings may be indicative of a particular sentiment. The biometric readings may provide a heart rate where a steady heart rate may indicate contentedness while an increased heart rate may indicate frustration or excitedness. As the biometric readings may be indicative of opposing sentiments, the biometric readings may provide further evidence of a particular sentiment that may be determined based on sensory information of another sensor 112. In yet another example, with the microphone, the processing operations may include auditory analyses including speech features. The speech feature may be extracted using a variety of mechanisms (e.g., Mel Frequency Cepstral Coefficients (MFCC) protocol). The speech feature may also parse an auditory input when words are spoken or analyze a noise that is uttered. The speech or noise may be fed into a text to emotion analyzer to perform keyword analysis via embedded natural language processing and aggregate varying sentiment levels including increasing noise levels. For example, the number of times a person utters a particular statement may add to building sentiment levels (e.g., frustration levels).

In preparation of transmitting the sensory information and/or the sentiment associated information (e.g., when processing is performed prior to transmission), the exchange client 114 may package the data as well as perform further operations. For example, the exchange client 114 may perform principal component analysis for dimensionality reduction for computation of the primary user's sentiment levels and streamlining the same with context of the primary smart device 110. The exchange client 114 may gather the output from the principal component analysis in conjunction with current spatial and temporal metrics (e.g., as may be determined by the imager, the biometric sensors, etc.) and store this combined data into a pattern history module. The exchange client 114 may further perform statistical clustering and classification methods to extract visual contextual information features, index the feature space, and classify relevant related information of the primary smart device 110 and other types of information into semantic categories. The exchange client 114 may perform K-means clustering to cluster the primary user's cognitive data.

In the exemplary embodiments, the version client 116 may act as a client in a client-server relationship and may be a software, hardware, and/or firmware based application capable of determining versions of applications such as an operating system and transmitting the version data via the network 108 as well as and receiving modification data via an ad hoc connection. In embodiments, the version client 116 may perform operations in an automated manner without user intervention although some implementations may incorporate manual operations by providing a user interface to confirm whether a modification to an application is to occur as well as interact with one or more components of the version modification system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

When the sensory information and/or the sentiment associated information is transmitted, the exchange client 114 may include further information. For example, the exchange client 114 may include an identity of the primary user utilizing the primary smart device 110. In another example, the exchange client 114 may include a version of an application that is being used that is associated with the sensory information and/or the sentiment associated information. The version of each application that is installed on the primary smart device 110 may be tracked by the version client 116. Thus, as modifications are made to the applications, the version client 116 may be configured to maintain a database of each application with associated version information. In this manner, the version client 116 may provide version information that is subsequently supplied to the profiling server 130. As the primary user may utilize a plurality of applications during a predefined temporal period, the sensory information and/or the sentiment associated information may include a temporal indication (e.g., a timestamp) along with temporal indications of when the applications are in use such that the sensory information and/or the sentiment associated information may be properly correlated. The exchange client 114 may also be configured to determine a window in which the sensory information and/or the sentiment associated information is to correspond to an application that lies outside the temporal indications. For example, the primary user may be using a first application and become frustrated and swap to a second application. Although the frustrated sentiment may temporally correspond to the second application, the exchange client 114 may still associate the frustrated sentiment to the first application due to the proximity in time, cause/effect analysis, etc. Thus, in packaging the data to be transmitted to the profiling server 130, the exchange client 114 may receive data from the one or more sensors 112 and the version client 116 as well as process data that are packaged and prepared for transmission.

As will be described in further detail below, the version client 116 may further be configured to modify a version of an application installed on the primary smart device 110. The version client 116 may receive sentiment associated information from one of the secondary smart devices 140 and determine whether a version of an application installed on the primary smart device 110 is to be modified to a version of an application installed on the secondary smart device 140 based on the sentiment associated information. For example, when a positive sentiment is associated with the version of the application installed on the secondary smart device 140, the version client 116 may determine that the version of the application installed on the primary smart device 110 is to be modified (e.g., to the version of the application installed on the secondary smart device 140). In another example, when a negative sentiment is associated with the version of the application installed on the secondary smart device 140, the version client 116 may determine that the version of the application installed on the primary smart device 110 is to be maintained and not modified. In instances where the version of the application installed on the primary smart device 110 is to be modified, the version client 116 may request and receive modification data from the secondary smart device 110 having the different version of the application over the ad hoc connection. The version client 116 may unpack the modification data and modify the version of the application (e.g., upgrade the application to a newer version, downgrade the application to an older version, alter a current version of the application to include or omit features associated with positive or negative sentiments, respectively, etc.).

In determining whether to accept a modification of a version of an application, the version client 116 may consider further parameters. For example, the version client 116 may determine whether a similarity threshold is satisfied. The similarity threshold may define a similarity as to whether a set of applications installed on the secondary smart device 140 is within an acceptable similarity to a set of applications installed on the primary smart device 110. As a result of the similarity between the set of applications being within the similarity threshold, the secondary smart device 140 may be an acceptable candidate to provide a basis to modify a version of an application on the primary smart device 110. The similarity threshold may be imposed (e.g., as determined by an administrator of the version modification system 100) so that the sentiment associated information may be more impactful with regard to modifications on the primary smart device 110. For example, as a result of the similarity threshold being satisfied, a sentiment experienced by a secondary user for a version of an application may have a likelihood of being substantially similar to a sentiment experienced by the primary user. In contrast, as a result of the similarity threshold not being satisfied, a sentiment experienced by a secondary user for a version of an application may have a different effect to the primary user. Accordingly, the exemplary embodiments may be configured so that modifications to versions of applications may be performed when the primary user is likely to have the same positive sentiment as a secondary user.

In the exemplary embodiments, the one or more secondary smart devices 140 may include one or more sensors 142, an exchange client 144, and a version client 146, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the primary smart device 110 is shown as a single device, in other embodiments, the primary smart device 110 may be comprised of a cluster or plurality of computing devices, in a modular manner, etc., working together or working independently. The primary smart device 110 is described in greater detail as a hardware implementation with reference to FIG. 4, as part of a cloud implementation with reference to FIG. 5, and/or as utilizing functional abstraction layers for processing with reference to FIG. 6.

The secondary smart devices 140 may be substantially similar to the primary smart device 110. For example, the secondary smart devices 140 may have a plurality of applications installed thereon. In another example, the sensors 142, the exchange client 144, and the version client 146 may provide substantially similar features as those described above in regard to the primary smart device 110.

As will be described in further detail below, the primary smart device 110 may determine whether to modify a version of an application based on sentiment associated information from one or more of the secondary smart devices 140. The secondary smart devices 140 may be associated with a respective secondary user. The primary user of the primary smart device 110 may utilize a social network including select ones of the secondary users. For example, the profiling server 130 may manage the social network to include one or more of the secondary users. In this manner, the social network of the primary user may define a set of qualified or trusted secondary users from which the sentiment associated information may be exchanged for purposes of modifying the version of the application.

The social network and/or the selection of qualified secondary users may be performed at a variety of times. In an exemplary implementation, the social network may be created prior to any iteration of operations used in modifying a version of an application. In another exemplary implementation, the social network may be created for each instance that a version of an application is to be modified. For example, at a time when one of the secondary smart devices 140 enters a range to perform the operations of the exemplary embodiments in determining when and how to modify a version of an application, the primary user may be prompted on the primary smart device 110 to enter an input to accept or reject the process involving the secondary smart device 140 associated with a secondary user. In accepting the process, the secondary user may be added into the social network of the primary user. In rejecting the process, the secondary user may be omitted from inclusion into the social network of the primary user.

The version modification system 100 utilizing the primary smart device 110 and the secondary smart devices 140 described above is only an exemplary implementation. For example, the primary smart device 110 has a perspective of determining when and how to modify a version of an application. Accordingly, the primary smart device 110 being described as including the one or more sensors 112 is only exemplary and may not be required. In another example, the exchange client 114 and the version client 116 of the primary smart device may be configured with select data exchange operations such as the exchange client 114 not being configured with sensory information processing capabilities (e.g., when the sensors 112 are not present), the version client 116 being configured to only accept sentiment associated information and effect any modification to applications without a capability of transmitting sentiment associated information, etc. In a similar manner, the exchange client 144 and the version client 146 of the secondary smart device 140 may be configured in an opposite configuration relative to the exchange client 114 and the version client 116.

In the exemplary embodiments, the data repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the version modification system 100. For example, the data repository 120 may be incorporated in the profiling server 130. Thus, access to the data repository 120 by the profiling server 130 may be performed locally. In another example, the profiles 122 represented in the data repository 120 may be incorporated in respective ones of the primary smart device 110 and/or the secondary smart device 140 (e.g., each smart device 110, 140 has a profile repository 120 including at least the profile 122 of the primary or secondary user who is respectively associated). Thus, access to the data repository 120 and to a specific one of the profiles 122 may be performed through a transmission from the primary smart device 110 and/or the secondary smart device 140. The data repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the profiles 122 may each be associated with a respective user including the primary user associated with the primary smart device 110 and the secondary users respectively associated with the secondary smart devices 140. The profiles 122 may be populated with various types of information that may be used for subsequent operations used in modifying versions of applications. For example, the profiles 122 may be associated with a user identification to uniquely identify the primary user or one of the secondary users to each of the profiles 122. In another example, each of the profiles 122 may include the sensory information and/or the sentiment associated information, applications installed on the respective smart device, versions of those applications, and associations between the sensory information/sentiment associated information with the applications.

In the exemplary embodiments, the profiling server 130 may include a sentiment program 132, a similarity program 134, and a social program 136, and act as a server in a client-server relationship with the exchange client 114, 144 as well as be in a communicative relationship with the data repository 120. The profiling server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the profiling server 130 is shown as a single device, in other embodiments, the profiling server 130 may be comprised of a cluster or plurality of computing devices, working together or working independently. While the profiling server 130 is also shown as a separate component, in other embodiments, the operations and features of the profiling server 130 may be incorporated with one or more of the other components of the version modification system 100. For example, the operations and features of the profiling server 130 may be incorporated in the primary smart device 110. The profiling server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the sentiment program 132 may be a software, hardware, and/or firmware application configured to generate the sentiment associated information by determining a sentiment experienced by the primary user and/or the secondary user while utilizing an application installed with a particular version. As described above, the profiling server 130 may be configured to generate the sentiment associated information in a substantially similar manner as may be performed by the sensor 112 or the exchange client 114. The sentiment program 132 may be configured to perform the operations in generating the sentiment associated information.

In the exemplary embodiments, the similarity program 134 may be a software, hardware, and/or firmware application configured to determine select ones of the secondary smart devices 140 that have substantially similar parameters or configurations as the primary smart device 110. As described above, the version client 116 may determine when to perform a modification of an application based at least in part to a similarity threshold. The above description relates to the version client 116 performing this feature. However, in another implementation, the similarity program 134 may be configured to perform this feature. The similarity program 134 may determine the parameters and/or configurations of the secondary smart devices 140 and incorporate the parameter information of the secondary smart devices 140 with the corresponding profiles 122. Accordingly, the secondary smart devices 140 may receive pre-processed parameter information to be exchanged with the primary smart device 110 (e.g., as included in the sentiment associated information).

In the exemplary embodiments, the social program 136 may be a software, hardware, and/or firmware application configured to maintain a social network for a given user (e.g., the primary user). As described above, the exemplary embodiments may allow modifications to applications according to sentiment based on qualified secondary users who are within the social network of the primary user. To prevent any sentiment to be accepted as the basis of modifying an application, the social network may identify secondary users who may provide sentiment associated information to the primary smart device 110. The social network of the primary user may be stored in the profile 122 corresponding to the primary user.

As will be described in further detail below, the exemplary embodiments may enable an offline approach to modifying a version of an application through the sentiment associated information that considers various other factors. In an exemplary implementation, once the cognitive state (e.g., sentiment) and contextual activity (e.g., application in use for the sentiment and version thereof) is recorded and correlated with each other, the satisfaction level of the secondary users may be determined according to a scale. For example, the scale may be a varying threshold of 1 to 5 may be provided to the primary user that may be cached and used to determine when and how to modify a version of an application. The scale from 1 to 5 may be ordered such that a 5 may imply that the secondary users are contented (e.g., highly satisfied sentiment) with the version of the application while a 1 may imply that the secondary users are frustrated (e.g., highly dissatisfied sentiment) with the version of the application.

The scale may be a user configurable policy. For example, the user may set a scale threshold that defines when to accept or reject a modification to a version of an application. The scale threshold may be set to, for example, 4 so that any sentiment of a secondary user for a version of an application that is at least 4 may indicate that the version of the application on the primary smart device 110 is to be modified. According to the exemplary implementation, using the scale, an offline recommendation may be provided or sent from the secondary smart device 140 to the primary smart device 110 when the primary smart device 110 and the secondary smart device 140 are in range of establishing the ad hoc communication pathway. The secondary smart device 140 may transmit a local copy cached thereon the secondary smart device 140 to the primary smart device 110 through the ad hoc communication pathway (e.g., MQTT, Bluetooth, RFID, NFC based tapping, etc.) to enable the offline transfer in a seamless fashion.

As described above, the sentiment associated information may provide a basis upon which to determine when and how to modify a version of an application. The exemplary embodiments may also consider further factors. As described above, an additional factor may be a similarity factor that considers a set of applications installed on the primary smart device 110 and a set of applications installed on a candidate secondary smart device 140. Further still, the exemplary embodiments may consider additional factors. For example, the exemplary embodiments may analyze how many errors occur in the secondary smart devices 140 as a result of using a particular version of an application. The exemplary embodiments may log performance metrics of a selected version of an application as well as error logs identifying a difference before and after a modification of a version of an application. The exemplary embodiments may filter the performance and error information according to a further similarity factor based on the technical characteristics of the secondary smart devices 140 relative to the primary smart device 110 (e.g., the same number of apps, versions thereof, memory, disk space, etc.).

The exemplary embodiments may be configured to modify a version of an application in an upgrade manner, a downgrade manner, or a selective manner. Accordingly, the exemplary embodiments provide a dynamic approach to managing versions of applications. For example, a particular user may express how an update has created a substantially poor user experience. This user may provide crowd based wisdom for comparison in determining when to modify a version of an application. Based upon the secondary smart devices 140 that satisfy the similarity threshold, the exemplary embodiments may also consider those secondary users utilizing similar secondary smart devices 140 that are also outside of the primary user's social network and identify a currently preferred version of an application. This feature may utilize a dynamic variable that may change as new versions of an application evolve with point releases and overall newer releases might offer further form or function, but might lack customer and client satisfaction. The comparison of the in network and out of network pertaining to the primary user's social networking contacts may be relevant. For example, select users may utilize a simpler standard where using a version of an application that has ease of use and simplicity is preferred. Other users may utilize a complex standard where an ability of form, quantity of overall function, and a larger footprint of system requirements pertaining to an advanced nature is preferred. The exemplary embodiments may therefore incorporate an ability to compare and contrast the types of secondary users and usage may be instrumental to understand given the situation of a primary user's projected future usage of an application.

Figure 2:
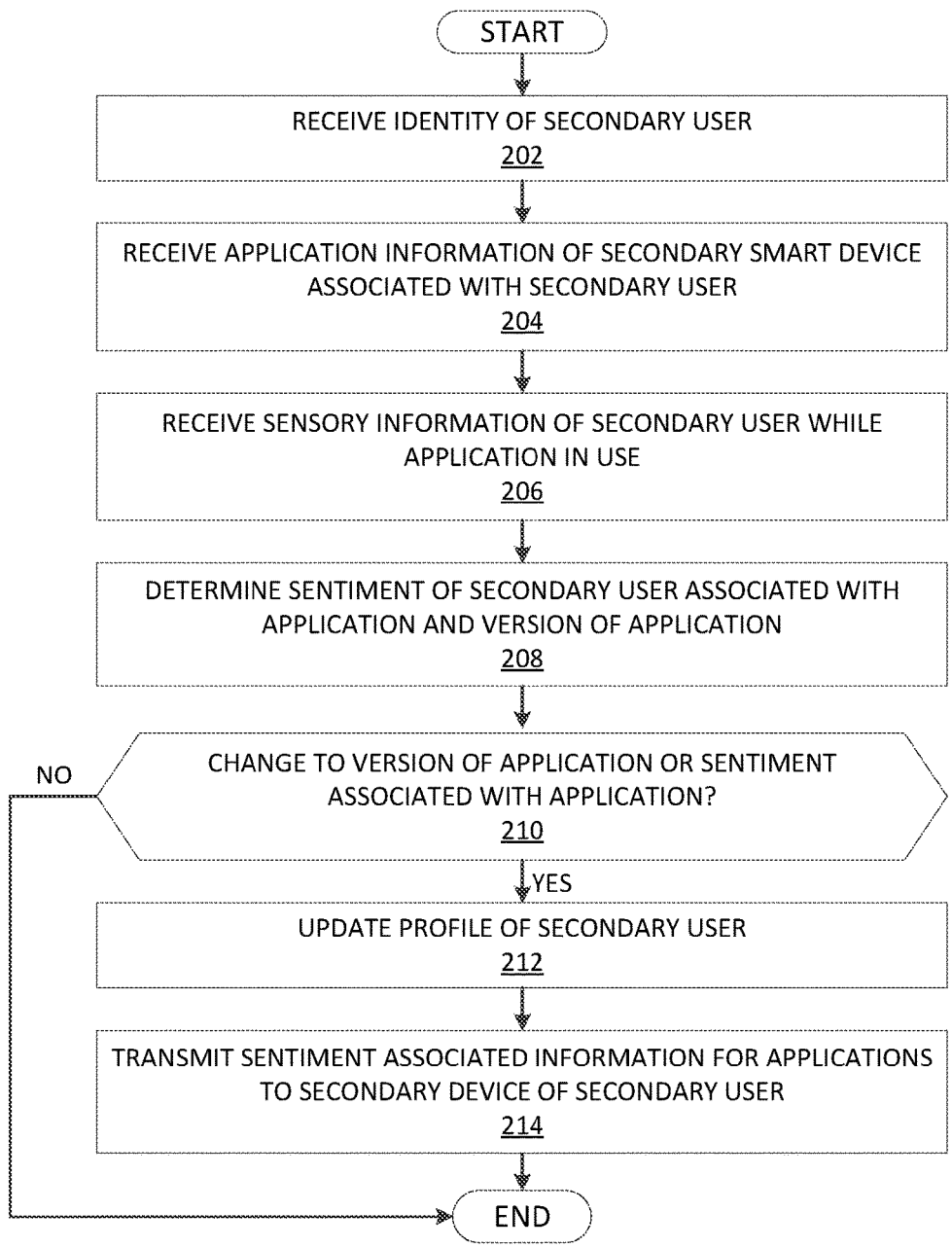
FIG. 2 depicts an exemplary flowchart of a method illustrating the operations of a profiling server 130 of the version modification system 100 in tracking sentiments of users for versions of applications, in accordance with the exemplary embodiments.

FIG. 2 depicts an exemplary flowchart of a method 200 illustrating the operations of the profiling server 130 of the version modification system 100 in tracking sentiments of users for versions of applications, in accordance with the exemplary embodiments. The method 200 may relate to operations that are performed by the sentiment program 132, the similarity program 134, and the social program 136 to determine sentiments and associating versions of applications with those sentiments. Accordingly, the method 200 is described with regard to the profiling server 130 performing a plurality of operations that may, in other exemplary embodiments, be performed by at least one of the sensor 112, the exchange client 114, and the version client 116. The method 200 will be described from the perspective of the profiling server 130.

The profiling server 130 may receive a transmission from the secondary smart devices 140. For each of the secondary smart devices 140, the profiling server 130 may receive an identity of a secondary user utilizing one of the secondary smart devices 140 (step 202), receive application information of the secondary smart device 140 (step 204), and receive sensory information of the secondary user while using a version of an application (step 206). As described above, the secondary smart device 140 may include one or more sensors 142 that gather and generate sensory information (e.g., using an imager, eye tracker, biometric sensor, microphone, etc.). According to the exemplary embodiment described with regard to the method 200, the secondary smart device 140 may package the sensory information via the exchange client 144 and transmit the sensory information to the profiling server 130 via the network 108. In addition, the exchange client 144 of the secondary smart device 140 may include identity information regarding an identity of the secondary smart device 140 as well as an identity of the secondary user associated with the secondary smart device 140. The exchange client 144 of the secondary smart device 140 may further include version information regarding versions of applications that are installed on the secondary smart device (e.g., as determined by the version client 146). The exchange client 144 may associated the version information with the sensory information that indicates the portions of the sensory information that corresponds to use with a version of an application.

The exchange of information from the secondary smart device 140 may be performed at a variety of times. For example, the secondary smart device 140 may transmit the above noted information at predetermined time intervals so that the profile 122 of the secondary user may be maintained according to this information exchange interval. In another example, the secondary smart device 140 may transmit the above noted information when an event occurs such as a change to a version of an application being registered.

The profiling server 130 may determine a sentiment of the secondary user associated with a version of an application (step 208). Based on the sensory information and the corresponding use of an identified version of an application, the profiling server 130 via the sentiment program 132 may determine sentiments in using the version of the application. For example, the sentiment associated information may indicate whether the secondary user is content or dissatisfied with the version of the application. The sentiments may be determined based on micro expressions on a face of the secondary user, utilize speech feature extraction, etc. The profiling server 130 may generate sentiment associated information that correlates the determined sentiment with the identified version of an application while used by the secondary user of the secondary smart device 140. In generating the sentiment associated information, the sentiment program 132 may assign a value according to a scale where a highest value in the scale is indicative of a highest satisfaction while a lowest value in the scale is indicative of a lowest satisfaction.

The sentiment associated information may be stored in a corresponding profile 122 stored in the data repository 120. In maintaining the profile 122 for the secondary user, the profiling server 130 may determine whether a change has occurred between the information that has been received and the information currently included in the profile 122 (decision 210). Specifically, the profiling server 130 may determine whether there has been a change to a version of an application and/or a change to a sentiment to a version of an application already included in the profile 122. As a result of there being no change to either of these factors (decision 210, "NO" branch), the profiling server 130 may maintain the profile 122 for the secondary user associated with the identified secondary smart device 140.

As a result of there being a change to at least one of these factors (decision 210, "YES" branch), the profiling server 130 may update the profile 122 corresponding to the secondary user associated with the identified secondary smart device 140 (step 212). The profiling server 130 may retrieve the updated profile 122 and transmit the sentiment associated information to the identified secondary smart device 140 in preparation for subsequent operations that may be performed through an ad hoc, offline connection (step 214).

Figure 3:
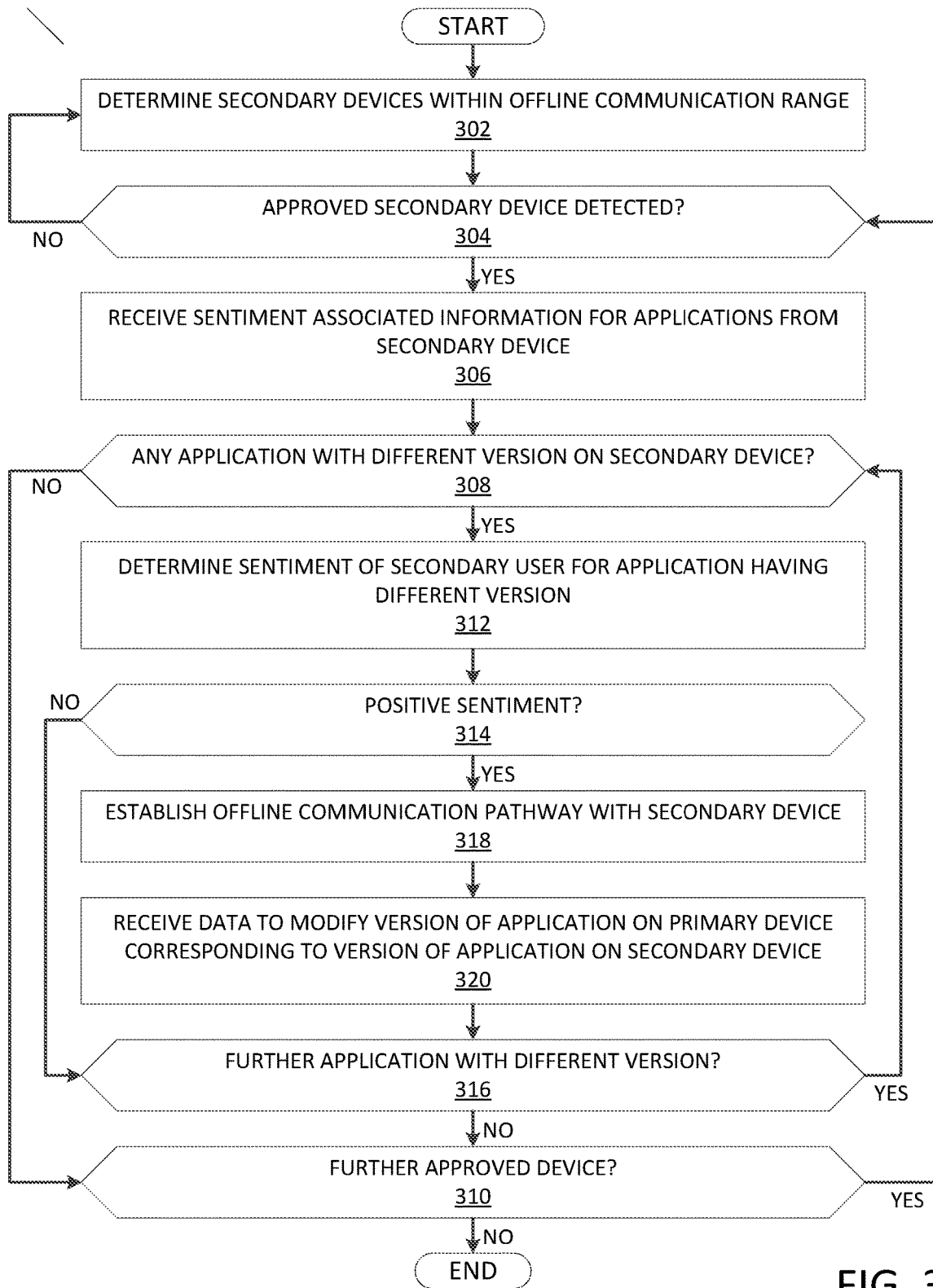
FIG. 3 depicts an exemplary flowchart of a method illustrating the operations of a primary smart device 110 of the version modification system 100 in modifying a version of an application, in accordance with the exemplary embodiments.

FIG. 3 depicts an exemplary flowchart of a method 300 illustrating the operations of the profiling server 130 of the version modification system 100 in modifying a version of an application, in accordance with the exemplary embodiments. The method 300 may relate to operations that are performed by the exchange client 114 and the version client 116 of the primary smart device 110 in cooperation with the exchange client 144 and the version client 146 of the secondary smart device 140 to exchange data for the primary device to determine when and how to modify an application installed thereon. Accordingly, the method 300 is described with regard to the primary smart device 110 performing a plurality of operations. The method 300 will be described from the perspective of the primary smart device 110.

The primary smart device 110 may determine secondary smart devices 140 that are within an offline communication range that may be established with an ad hoc connection (step 302). As described above, the exemplary embodiments may allow the primary smart device 110 to determine when and how to modify versions of applications utilizing an offline approach (e.g., without direct use of the network 108). In utilizing the offline approach, the primary smart device 110 may rely on select ones of the secondary smart device 140 that are within a communicable range of the ad hoc connection. Accordingly, the primary smart device 110 may initially identify the secondary smart devices 140 that are in this range. The primary smart device 110 may identify the secondary smart devices 140 using a variety of mechanisms. For example, the primary smart device 110 and the secondary smart devices 140 may be equipped with Bluetooth technology where Bluetooth signals (e.g., under the Bluetooth Light protocol) may be broadcast and received for identification and pairing purposes. In another example, the primary smart device 110 and the secondary smart device 140 may be equipped with RFID technology (e.g., passive, aggressive, or a combination thereof) for the smart devices to identify one another that are within the communicable range of the ad hoc connection.

The primary smart device 110 may determine whether any of the select ones of the secondary smart devices 140 are associated with a secondary user who is approved, qualified, and/or trusted (decision 304). As described above, the primary user may have a social network including a plurality of secondary users where inclusion of the secondary users in the social network may be indicative of being qualified for use of the features of the exemplary embodiments. As a result of the secondary smart devices 140 that are within the communicable range being associated with secondary users outside the social network (decision 304, "NO" branch), the primary smart device 110 may continue to monitor an area covered by the communicable range for further secondary smart devices 140 (step 302).

As a result of the secondary smart devices 140 that are within the communicable range being associated with at least one secondary user within the social network (decision 304, "YES" branch), the primary smart device 110 may receive sentiment associated information for versions of applications installed on the secondary smart device 140 (step 306). As described above, particularly with regard to the method 200, the secondary smart devices 140 may receive the sentiment associated information (e.g., including sentiments experienced in using versions of applications) as stored in the corresponding profiles 122 in preparation for iterations of the method 300.

For the determined, qualified secondary device 140 that is within the ad hoc communicable range, the primary smart device 110 may determine whether a version of an application installed on the primary smart device 110 is different than a version of the same application installed on the secondary smart device 140 (decision 308). As the features of the exemplary embodiments are directed toward modifying a version of an application installed on the primary smart device 110, a difference in the version of the application may trigger subsequent operations. As a result of each application included in the sentiment associated information for the secondary smart device 140 having the same version of the corresponding application installed on the primary smart device (decision 308, "NO" branch), the primary smart device 110 may determine if there are any further secondary smart devices within the ad hoc communicable range (decision 310). If there is at least one further secondary smart device 140 (decision 310, "YES" branch), the primary smart device 110 may perform another iteration of the method 300. If there is no further secondary smart device 140 (decision 310, "NO" branch), the primary smart device 110 may conclude the process.

As a result of the secondary smart device 140 having at least one application with a different version to a corresponding application installed on the primary smart device 110 (decision 308, "YES" branch), the primary smart device 110 may determine a sentiment of the secondary user in using the version of the application that is installed thereon (step 312). The primary smart device 110 may determine whether the sentiment for the version of a selected application is a positive sentiment (decision 314). As a result of the secondary user having a negative sentiment (decision 314, "NO" branch), the primary smart device 110 may conclude that the current version of the application installed on the primary smart device 110 may be preferable and maintain that version. The primary smart device 110 may then determine if there is at least one further application with a different version (decision 316). As a result of no further application with a different version (decision 316, "NO" branch), the primary smart device 110 may determine whether there are any further secondary smart devices 140 (decision 310). As a result of there being at least one further application with a different version (decision 316, "YES" branch), the primary smart device 110 may perform another iteration of the method 300 (decision 308).

As a result of the sentiment being positive for a version of an application that is different than the version of the application installed on the primary smart device 110 (decision 314, "YES" branch), the primary smart device may establish an offline communication pathway (e.g., the ad hoc connection) with the secondary smart device 140 (step 318). In establishing the ad hoc connection, the primary smart device 110 may receive data to modify the version of the application on the primary smart device 110 to a version of the application on the secondary smart device 140 (step 320). For example, the primary smart device 110 may request that modification data be transmitted for the modification to take place. As described above, the modification of the version may be an upgrade to a newer version, a downgrade to an older version, or a selective modification for one or more features of the application. Upon receiving the modification data, the primary smart device 110 may perform the appropriate modification. Thereafter, the primary smart device 110 may determine if there are any further applications with different versions (decision 316).

It is noted that the same version of the application being a basis upon which to perform subsequent operations is only exemplary. The exemplary embodiments may be configured to also utilize information regarding the secondary smart device 140 having the same version of the application. As described with the exemplary embodiments, one skilled in the art will understand that such a condition of having the same version may also provide insight as to when and how to modify the version of the application installed on the primary smart device 110. For example, the secondary user may be content with the same version of the application that is installed on the primary smart device 110. Accordingly, the primary smart device 110 may select to retain the version of the application. In another example, the secondary user may be discontent with the same version of the application that is installed on the primary smart device 110. Accordingly, the primary smart device 110 may select to modify the version of the application (e.g., downgrade to an older version, upgrade to a newer, available version, etc.) as the sentiment may be shared by the primary user.

When described from the perspective of the secondary smart device 140, the exemplary embodiments may further disclose a method involving operations performed by the secondary smart device 140 to modify a version of an application installed on the primary smart device 110. For example, the secondary smart device 140 may receive the sentiment associated information from the profiling server 130. At a subsequent time when the secondary smart device 140 is in communicable range with the primary smart device 110, the ad hoc connection being established, and after select operations are performed on the primary smart device 110 (e.g., verifying that the secondary smart device 140 is used by a secondary user who is in the social network of the primary user), the secondary smart device 140 may receive a request for the sentiment associated information. When a different version of an application is installed on the primary smart device 110, the secondary smart device 140 may receive a request for modification data such that the version of the application on the primary smart device 110 may be modified to be the same version of the application on the secondary smart device 140.

The exemplary embodiments are configured to provide an offline approach to modifying a version of an application installed on a device associated with a first user based on crowd sourced sentiments of second users utilizing the application with a different version. By gathering sentiments of second users corresponding to use of a version of an application through sensory information measured for the second users, each device of the second users may have sentiment associated information correlating sentiments to versions of applications. When the device of the first user is in range of the device of the second user, an ad hoc connection may be established for the sentiment associated information to be exchanged. According to the exemplary embodiments, the sentiment associated information may be used to determine when and how to modify the version of the application of the device of the first user.

Figure 4:
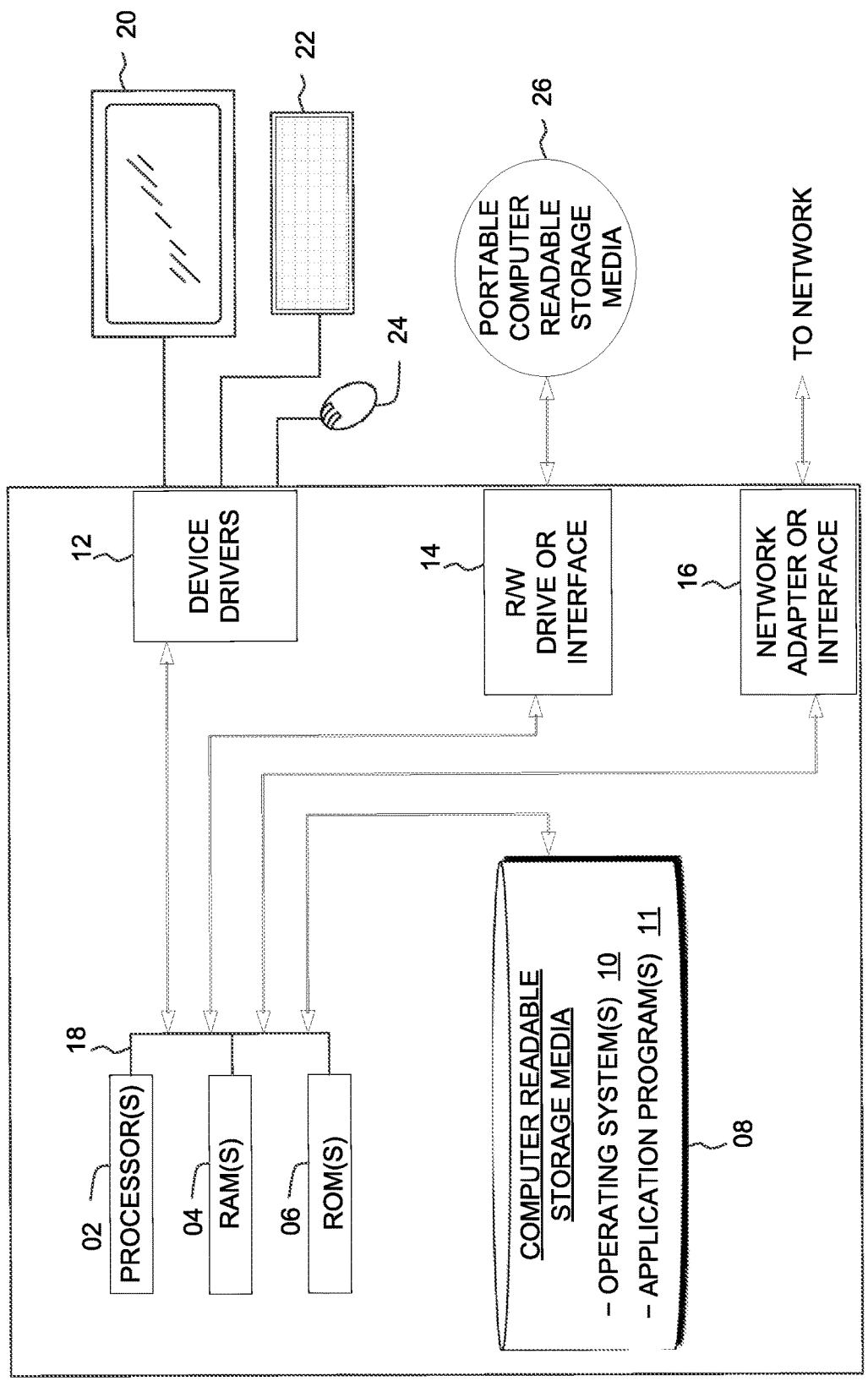
FIG. 4 depicts an exemplary block diagram depicting the hardware components of the version modification system 100 of FIG. 1, in accordance with the exemplary embodiments.

FIG. 4 depicts a block diagram of devices within the version modification system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
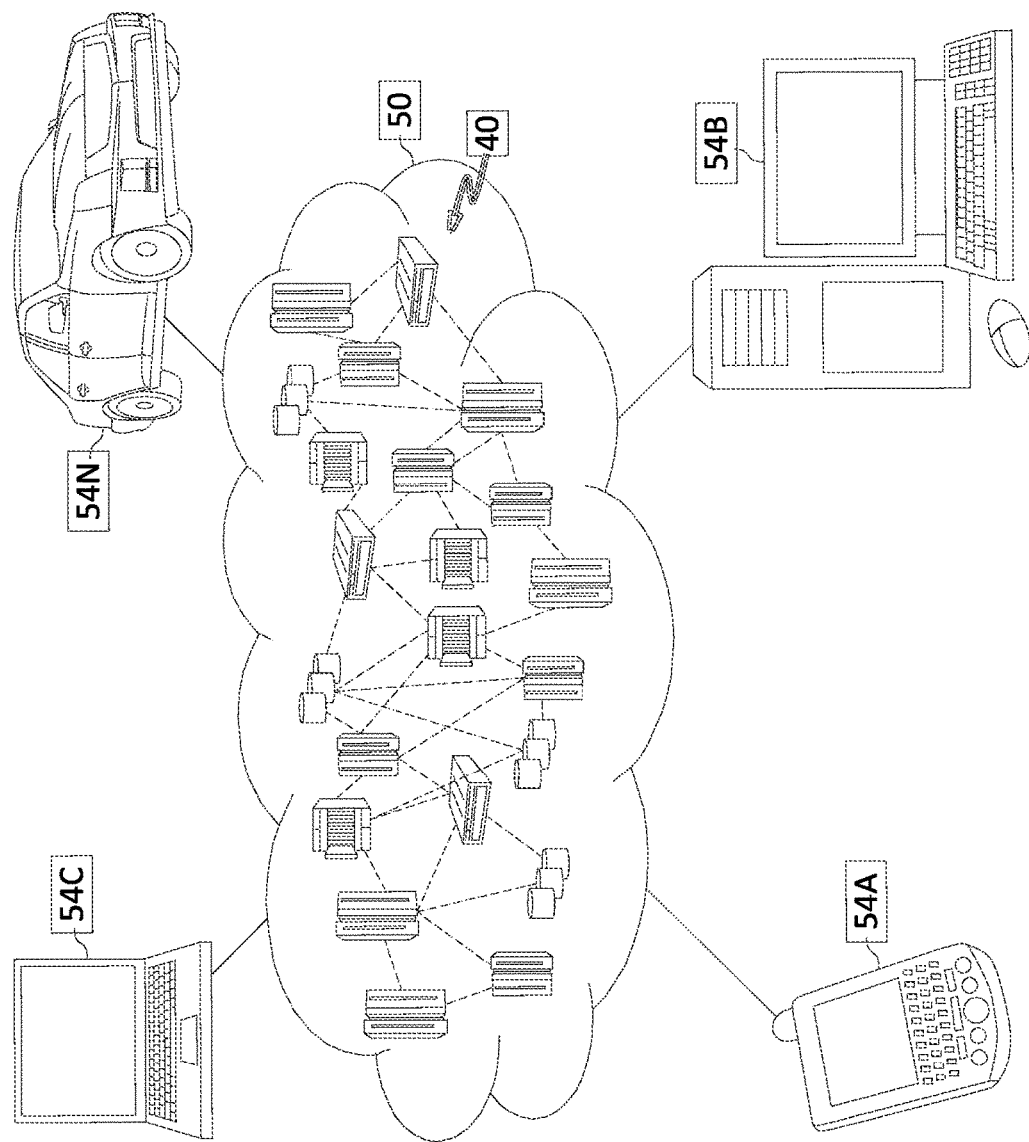
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
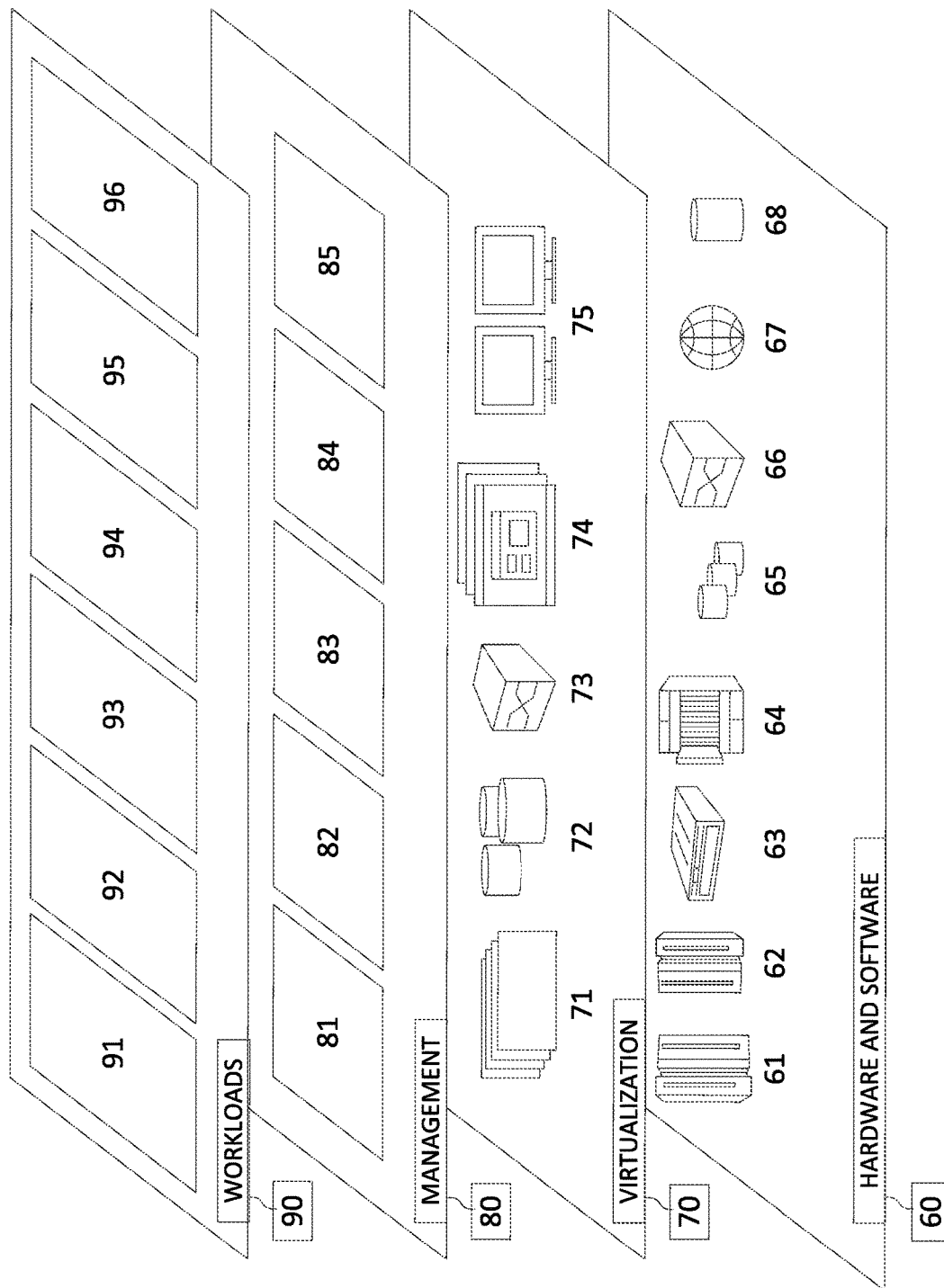
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application version processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for modifying a first version of an application installed on a first device associated with a first user, the method comprising:
   determining a sentiment being experienced by a second user while using a second version of the application installed on a second device associated with the second user based on sensory information indicative of the sentiment;
   generating sentiment associated information associating the sentiment of the second user with the second version of the application, the sentiment associated information configured to be exchanged with the first device over an offline, ad hoc connection; and
   transmitting the sentiment associated information to the second device,
   wherein the sentiment associated information is indicative of whether the first version of the application is to be modified on the first device to the second version of the application.

2. The computer-implemented method of claim 1, wherein the sensory information is one of visually based information, auditory based information, haptic based information, or a combination thereof related to at least one of the second user and the second device.

3. The computer-implemented method of claim 1, further comprising:
   receiving an identity of the second user from the second device;
   receiving the sensory information from the second device; and
   receiving version information from the second device, the version information indicative of the second version of the application used in generating the sensory information.

4. The computer-implemented method of claim 1, further comprising:
   determining a social network of the first user, the social network indicating a set of qualified second users allowed to exchange the sentiment associated information,
   wherein, as a result of the second user being in the social network of the first user, the sentiment associated information is configured to be exchanged over the ad hoc connection.

5. The computer-implemented method of claim 1, further comprising:
   receiving technical information of the second device, the technical information indicative of a set of installed applications and a set of hardware of the second device,
   wherein, as a result of the technical information of the second device satisfying a similarity threshold to technical information of the first device, the sentiment associated information is configured to be exchanged over the ad hoc connection.

6. The computer-implemented method of claim 1, wherein the first version is modified to the second version as one of an upgrade, a downgrade, or a selective modification.

7. The computer-implemented method of claim 1, wherein the application is an operating system.

8. A computer program product for modifying a first version of an application installed on a first device associated with a first user, the computer program product comprising:
   one or more non-transitory computer-readable storage media and program instructions stored on the one or more non-transitory computer-readable storage media capable of performing a method, the method comprising:
   determining a sentiment being experienced by a second user while using a second version of the application installed on a second device associated with the second user based on sensory information indicative of the sentiment;

generating sentiment associated information associating the sentiment of the second user with the second version of the application, the sentiment associated information configured to be exchanged with the first device over an offline, ad hoc connection; and transmitting the sentiment associated information to the second device, wherein the sentiment associated information is indicative of whether the first version of the application is to be modified on the first device to the second version of the application.

9. The computer program product of claim 8, wherein the sensory information is one of visually based information, auditory based information, haptic based information, or a combination thereof related to at least one of the second user and the second device.

10. The computer program product of claim 8, wherein the method further comprises:

receiving an identity of the second user from the second device;

receiving the sensory information from the second device; and receiving version information from the second device, the version information indicative of the second version of the application used in generating the sensory information.

11. The computer program product of claim 8, wherein the method further comprises:

determining a social network of the first user, the social network indicating a set of qualified second users allowed to exchange the sentiment associated information, wherein, as a result of the second user being in the social network of the first user, the sentiment associated information is configured to be exchanged over the ad hoc connection.

12. The computer program product of claim 8, wherein the method further comprises:

receiving technical information of the second device, the technical information indicative of a set of installed applications and a set of hardware of the second device, wherein, as a result of the technical information of the second device satisfying a similarity threshold to technical information of the first device, the sentiment associated information is configured to be exchanged over the ad hoc connection.

13. The computer program product of claim 8, wherein the first version is modified to the second version as one of an upgrade, a downgrade, or a selective modification.

14. The computer program product of claim 8, wherein the application is an operating system.

15. A computer system for modifying a first version of an application installed on a first device associated with a first user, the computer system comprising:

one or more computer processors, one or more computer-readable storage media, and program instructions stored on the one or more of the computer-readable storage media for execution by at least one of the one or more processors capable of performing a method, the method comprising:

determining a sentiment being experienced by a second user while using a second version of the application installed on a second device associated with the second user based on sensory information indicative of the sentiment;

generating sentiment associated information associating the sentiment of the second user with the second version of the application, the sentiment associated information configured to be exchanged with the first device over an offline, ad hoc connection; and transmitting the sentiment associated information to the second device, wherein the sentiment associated information is indicative of whether the first version of the application is to be modified on the first device to the second version of the application.

16. The computer system of claim 15, wherein the sensory information is one of visually based information, auditory based information, haptic based information, or a combination thereof related to at least one of the second user and the second device.

17. The computer system of claim 15, wherein the method further comprises:

receiving an identity of the second user from the second device;

receiving the sensory information from the second device; and receiving version information from the second device, the version information indicative of the second version of the application used in generating the sensory information.

18. The computer system of claim 15, wherein the method further comprises:

determining a social network of the first user, the social network indicating a set of qualified second users allowed to exchange the sentiment associated information, wherein, as a result of the second user being in the social network of the first user, the sentiment associated information is configured to be exchanged over the ad hoc connection.

19. The computer system of claim 15, wherein the method further comprises:

receiving technical information of the second device, the technical information indicative of a set of installed applications and a set of hardware of the second device, wherein, as a result of the technical information of the second device satisfying a similarity threshold to technical information of the first device, the sentiment associated information is configured to be exchanged over the ad hoc connection.

20. The computer system of claim 15, wherein the first version is modified to the second version as one of an upgrade, a downgrade, or a selective modification.

21. A computer-implemented method for modifying a first version of an application installed on a first device associated with a first user, the method comprising:

determining whether a second device associated with a second user is within a communicable range of an offline, ad hoc connection;

as a result of the second device being within the communicable range, receiving sentiment associated information, the sentiment associated information associating a sentiment experienced by a second user while using a second version of the application installed on a second device associated with the second user based on sensory information indicative of the sentiment;

determining whether the first version of the application installed on the first device is to be modified to the second version of the application installed on the second device based on the sentiment associated information;

as a result of determining the first version is to be modified to the second version, receiving modification data from the second device, the modification data configured to modify the application from the first version to the second version; and modifying the first version to the second version for the application installed on the first device based on the modification data.

22. The computer-implemented method of claim 21, further comprising:

determining whether the second user is within a social network of the first user, the social network indicating a set of qualified second users allowed to exchange the sentiment associated information, wherein the sentiment associated information is exchanged as a result of the second user being within the social network of the first user.

23. The computer-implemented method of claim 21, wherein the sensory information is one of visually based information, auditory based information, haptic based information, or a combination thereof related to at least one of the second user and the second device.

24. The computer-implemented method of claim 21, wherein determining that the first version is to be modified to the second version is based on the sentiment associated information indicating the sentiment is positive for the second user in using the second version of the application.

25. A computer-implemented method for modifying a first version of an application installed on a first device associated with a first user, the method comprising:

receiving sensory information from at least one sensor on a second device associated with a second user, the sensory information is indicative of a sentiment of the second user while using a second version of the application installed on the second device;

transmitting the sensory information, identity information, and version information to a profiling server, the identity information indicative of the second user, the version information indicative of the application having the second version on the second device;

receiving sentiment associated information associating the sentiment of the second user with the second version of the application; and upon establishing an offline, ad hoc connection with the first device, transmitting the sentiment associated information from the second device to the first device, wherein the sentiment associated information is indicative of whether the first version of the application is to be modified on the first device to the second version of the application.

* * * * *